US005930121A

United States Patent [19]

Henry

[11] Patent Number: 5,930,121

[45] Date of Patent: Jul. 27, 1999

[54] DIRECT DRIVE BACKLIGHT SYSTEM

[75] Inventor: George C. Henry, Huntington Beach, Calif.

[73] Assignee: Linfinity Microelectronics, Garden Grove, Calif.

[21] Appl. No.: 09/042,125

[22] Filed: Mar. 13, 1998

Related U.S. Application Data

[60] Provisional application No. 60/040,758, Mar. 14, 1997.

[51] Int. Cl.[6] .............................. H02M 3/335; G05F 1/00

[52] U.S. Cl. .............................................. 363/16; 315/307

[58] Field of Search ................................. 363/15, 16, 17, 363/22–25, 97, 98, 131, 132; 315/209 R, 224, 291, 307, DIG. 4, DIG. 5

[56] References Cited

U.S. PATENT DOCUMENTS

| | | | |
|---|---|---|---|
| 4,053,813 | 10/1977 | Kornrumpf et al. . | |
| 4,307,441 | 12/1981 | Bello . | |
| 4,453,522 | 6/1984 | Moreau . | |
| 4,480,201 | 10/1984 | Jaeschke . | |
| 4,555,673 | 11/1985 | Huijsing et al. . | |
| 4,585,974 | 4/1986 | Stupp et al. . | |
| 4,626,770 | 12/1986 | Price, Jr. . | |
| 4,682,080 | 7/1987 | Ogawa et al. | 315/209 R |
| 4,779,037 | 10/1988 | LoCascio . | |
| 4,792,747 | 12/1988 | Schroeder . | |
| 4,812,781 | 3/1989 | Regnier . | |
| 4,885,486 | 12/1989 | Shekhawat et al. . | |
| 5,083,065 | 1/1992 | Sakata et al. . | |
| 5,130,635 | 7/1992 | Kase . | |
| 5,220,272 | 6/1993 | Nelson . | |
| 5,289,051 | 2/1994 | Zitta . | |
| 5,327,028 | 7/1994 | Yum et al. . | |
| 5,471,130 | 11/1995 | Agiman . | |
| 5,475,285 | 12/1995 | Konopka . | |
| 5,479,337 | 12/1995 | Voigt . | |
| 5,514,947 | 5/1996 | Berg . | |
| 5,528,192 | 6/1996 | Agiman . | |
| 5,552,697 | 9/1996 | Chan . | |
| 5,563,501 | 10/1996 | Chan . | |
| 5,608,312 | 3/1997 | Wallace . | |
| 5,612,594 | 3/1997 | Maheshwari | 315/224 |
| 5,615,093 | 3/1997 | Nalbant . | |
| 5,619,402 | 4/1997 | Liu | 363/20 |
| 5,719,474 | 2/1998 | Vitello | 315/204 |
| 5,748,460 | 5/1998 | Ishihawa | 363/21 |

*Primary Examiner*—Matthew Nguyen
*Attorney, Agent, or Firm*—Knobbe, Martens, Olson & Bear LLP

[57] ABSTRACT

A power conversion circuit drives a cold cathode fluorescent lamp (CCFL) while requiring minimal number of external components. The circuit includes a controller, a direct drive network responsive to control inputs from the controller and coupled to receive a power signal, and a secondary network coupled to the CCFL. The direct drive network is low Q circuit comprising a plurality of switching transistors and a primary winding of a transformer such that an impedance of the direct drive network consists essentially of an inductance of the primary winding and capacitance of the direct drive network consists essentially of parasitic capacitance reflected from the secondary winding. The Q of the direct drive network is less than about 0.5 so that a square wave voltage signal is provided across the primary winding of the transformer. However, the inductance of the transformer is sufficiently high such that the voltage across a secondary winding of the transformer is sinusoidal. The secondary network comprises the secondary winding of the transformer coupled to the CCFL through a connector to provide a sinusoidal current to the CCFL. The controller controls the current passing through the CCFL by pulse width modulating the control inputs to the direct drive network.

35 Claims, 13 Drawing Sheets

DIRECT DRIVE BACKLIGHT SYSTEM

RELATED APPLICATION

This application claims the benefit of priority under 35 U.S.C. §119(e) of U.S. Provisional Application No. 60/040,758, filed Mar. 14, 1997.

BACKGROUND OF THE INVENTION

1. Field of the Invention

This present invention relates to a power conversion circuit for driving fluorescent lamps, such as, for example, cold cathode fluorescent lamps (CCFLs) and more particularly to the drive topology of such circuits.

2. Description of the Related Art

Fluorescent lamps are used in a number of applications where light is required but the power required to generate light is limited. One such application is the backlighting for a notebook computer, or the like. One particular type of fluorescent lamp is a cold cathode fluorescent lamp (CCFL). Such lamps require a high starting voltage (on the order of 700–1,600 volts) for a short period of time to ionize the gas contained within the lamp tubes and fire or ignite the lamp. After the gas in a CCFL is ionized and the lamp is fired, less voltage is needed to keep the lamp on.

CCFL tubes typically contain a gas, such as Argon, Xenon, or the like, along with a small amount of Mercury. After an initial ignition stage and the formation of plasma, current flows through the tube which results in the generation of ultraviolet light. The ultraviolet light in turn strikes a phosphoric material coated in the inner wall of the tube, resulting in visible light.

Power converter circuits such as the LX1580 and LX1581 controllers available from Linfinity Microelectronics Inc. of Garden Grove, Calif. have been used for driving CCFL circuits. Such circuits are designed to drive the CCFL indirectly through a high Q drive circuit (typically on the order of a Q=1 or greater) which preferably includes a resonant circuit and the primary winding of an output transformer. (The Q, or quality, of a circuit is the inductive or capacitive reactance of the circuit at resonance divided by the resistance.) The secondary of the transformer is coupled to the lamp and includes feedback for sensing current flowing through the lamp. Typically, the feedback is provided through a secondary transformer to provide the sensed current to the controller. The resonant circuit is either in a half bridge topology or a full bridge topology using power MOSFETS (metal oxide semiconductor field effect transistors) to provide the DC to AC conversion. Since the drive circuit including the transistors is a high Q resonant circuit, the DC voltage is converted into substantially a sine wave by the resonant circuit.

To control the current through the lamp and to provide dimming capability in the LX1581, the controller circuit typically drives the MOSFETS at a high frequency based upon the resonant frequency of the resonant circuit. Maximum power is provided by switching the MOSFETS at the resonant frequency of the circuit, and the output current can be controlled by changing the frequency of the output drive signals either towards the resonant frequency or away from the resonant frequency.

However, although such circuits represent a dramatic improvement over earlier prior art CCFL circuits, they have certain disadvantages. To attain a high Q circuit, additional capacitors and inductors typically need to be added to the circuit. As a result, this increases the number of external components. Increasing the number of external components increases the total cost and also increases the surface area of a printed circuit board using the product. In portable applications, such as notebook computers and personal digital assistants (PDAs), size may be critical and therefore it is desired to reduce the number of components.

SUMMARY OF THE INVENTION

The present invention provides an improved method and apparatus for driving a cold cathode fluorescent lamp (CCFL) while reducing the number of external components. In accordance with one aspect of the invention, a power conversion circuit comprises a low Q direct drive network responsive to control inputs and coupled to receive a power signal, a secondary direct drive network, and a controller which controls the direct drive network by providing control inputs to the direct drive network. The low Q direct drive network comprises a plurality of switching transistors and a primary winding of a transformer such that an impedance of the direct drive network comprises an inductance of the primary winding, and the capacitance of the direct drive network comprises parasitic capacitances of the plurality of transistors. The Q of the direct drive network is less than about 0.5 so that a rectangular wave voltage signal is provided across the primary winding of the transformer. The secondary network comprises a secondary winding of the transformer coupled to the CCFL through a connecter to provide a substantially sinusoidal current to the CCFL.

In one embodiment of the present invention, the controller is a quad output pulse width modulating controller coupled to the plurality of switching transistors. The controller preferably drives the switching transistors at a fixed frequency which is chosen for maximum light output. The controller provides current control and dimming by modulating the pulse widths of the control inputs to the direct drive network. In addition, the power conversion circuit also comprises a feedback circuit which detects the total current passing through the CCFL and which provides a voltage signal representative of the total current to the controller so that the controller may control the current passing through the CCFL.

In a further embodiment of the present invention, a pulse width modulation controller generates two output signals to drive a pair of switching transistors connected to opposite terminals of the centertapped primary of a transformer. The output of the transformer provides voltage to the CCFL. Current feedback and voltage feedback are provided to control the intensity of the light generated by the controller and to prevent an overvoltage condition. Preferably, the embodiment includes a circuit which detects when a CCFL is not drawing current and which enables a lamp striking circuit. The lamp striking circuit applies control signals to the switching transistors at an increasing frequency. The increasing frequency results in an increasing voltage on the secondary of the transformer to aid in striking the lamp. When the lamp strikes and current flows, the lamp striking circuit is automatically disabled so that the increased voltage is no longer applied to the lamp. Preferably, the lamp striking circuit includes a duty cycle control circuit so that the higher frequencies and higher voltages are not applied continuously to the transformer.

BRIEF DESCRIPTION OF THE DRAWINGS

The present invention will be described below in connection with the accompanying drawings in which:

FIG. 5, comprising

FIG. 7, comprising

FIG. 9, comprising

DETAILED DESCRIPTION OF THE PREFERRED EMBODIMENTS

Figure 1:
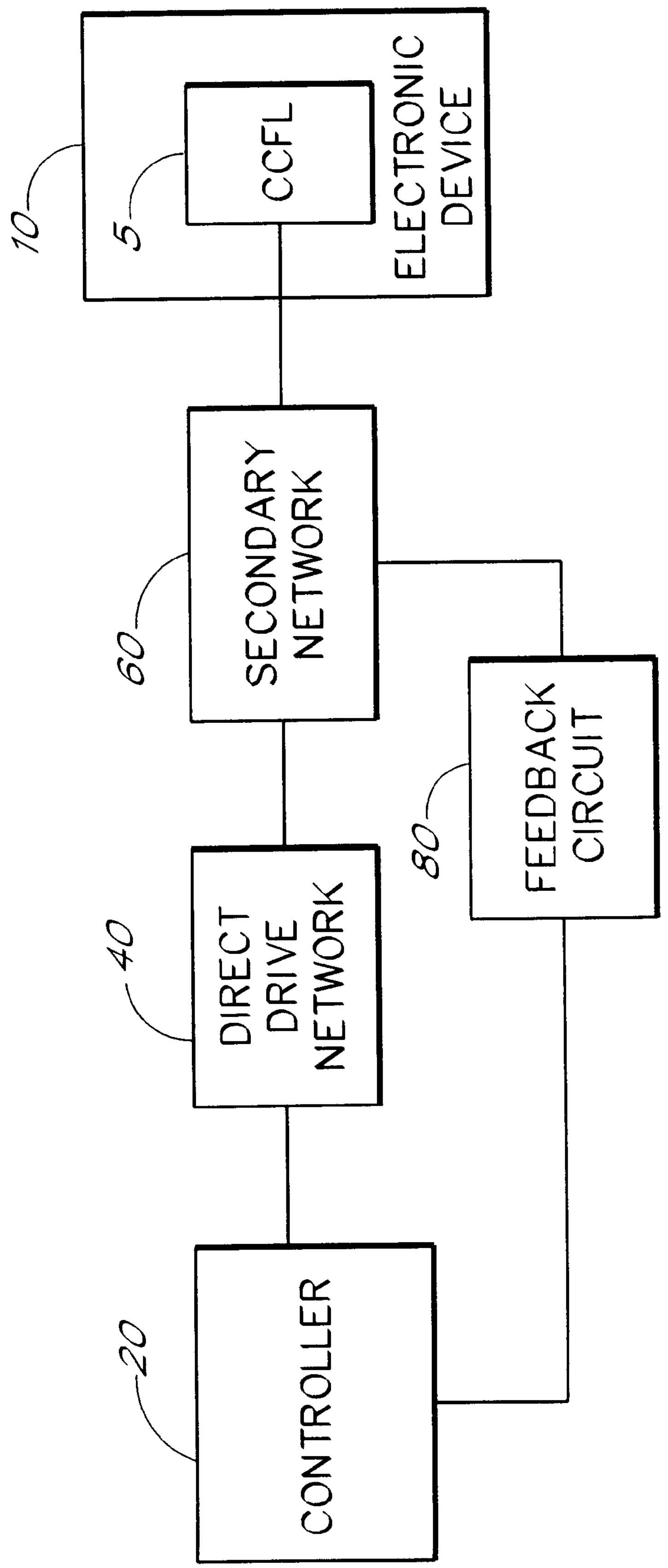
FIG. 1 is a block diagram of a power conversion circuit according to one embodiment of the present invention.

Embodiments of the present invention will be described hereinafter with reference to the drawings. As illustrated in FIG. 1, a power conversion circuit in accordance with a first embodiment of the present invention comprises a controller 20, a direct drive network 40, a secondary network 60, a CCFL 5 and a feedback circuit 80. The CCFL 5 provides illumination in an electronic device 10, such as, for example, a flat panel display, a computer, a personal digital assistant, a palm top computer, a scanner, a facsimile machine, a copier, or the like.

The controller 20 is coupled to the direct drive network 40 which comprises a plurality of switching transistors coupled between the supply voltage VCC (e.g., 12V) and the ground in a full bridge topology. The control node (e.g., gate) of each transistor is coupled to the controller 20 to allow the controller 20 to control the switching of each transistor. The direct drive network 40 also comprises a primary winding of a transformer which also has a secondary winding. The primary winding of the transformer generally operates as an inductive circuit with some parasitic capacitance. The outputs of the transistors are coupled directly to the primary winding without using any inductors and capacitors to tune the primary circuit to the operating frequency of the controller 20. Thus, the primary winding of the transformer has a low Q at the operating frequency.

The primary winding of the direct drive network 40 is magnetically coupled through a permeable core to a secondary network 60. The secondary network 60 comprises the secondary winding of the transformer, a reactive circuit element and a connector coupled to the CCFL 5. The direct drive and secondary networks convert the DC voltage coupled through the transistors into substantially a sinusoidal AC current shown as $I_{LAMP}$ in FIG. 5H (wherein a dashed curve represents the secondary voltage and the solid curve represents the current through the CCFL 5.) The sinusoidal AC current passes through the CCFL 5 to illuminate the CCFL 5. As set forth above, the impedance of the direct drive network 40 is largely inductive from the primary winding of the transformer with the capacitive reactance arising principally from the parasitic capacitances reflected from the secondary winding.

The secondary network 60 is coupled to a feedback circuit 80 which is also coupled to the controller 20 in order to provide a feedback signal to the controller 20. The feedback circuit 80 detects the total current passing through the CCFL 5 and generates a voltage signal representative of the total current. The feedback circuit 80 provides the feedback voltage signal to the controller 20 so that the controller 20 can appropriately adjust the current passing through the CCFL.

Figure 2:
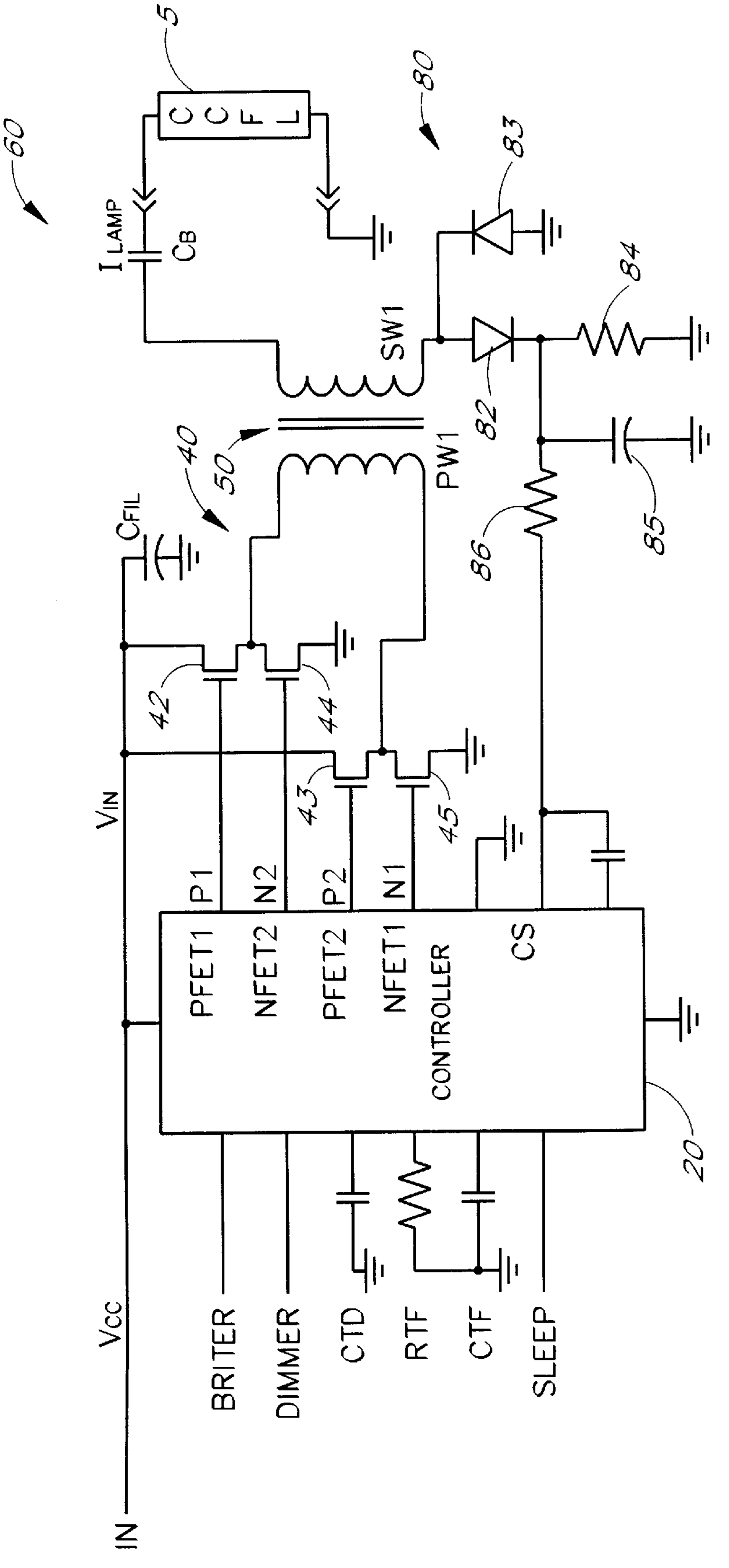
FIG. 2 is a schematic diagram of a power conversion circuit according to one embodiment of the present invention.

As illustrated in FIG. 2, the controller 20 is preferably a fixed frequency, quad output pulse width modulator monolithic integrated circuit. The controller 20 has outputs PFET1, PFET2, NFET1 and NFET2 which provide respective transistor drive signals P1, P2, N1 and N2 (shown in FIGS. 5D–5G) to the gates of the switching transistors in the direct drive network 40.

Figure 3:
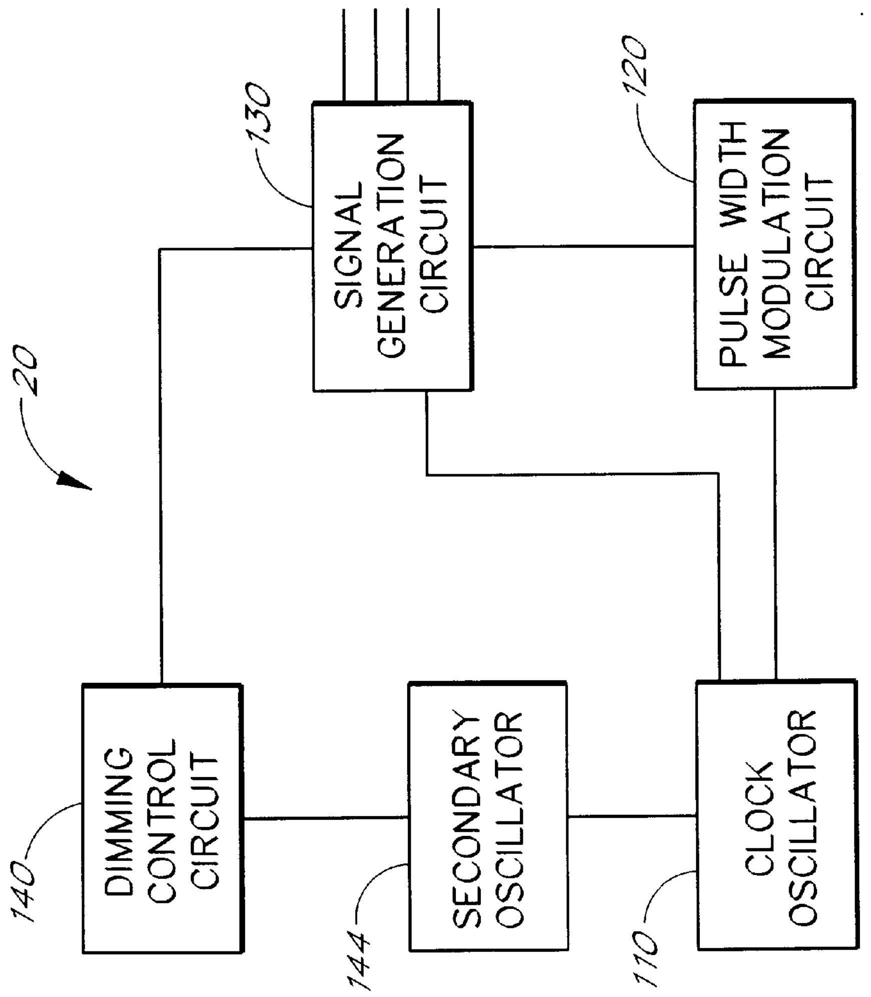
FIG. 3 is a block diagram of an embodiment of the controller shown in FIG. 2.
Figure 4B:
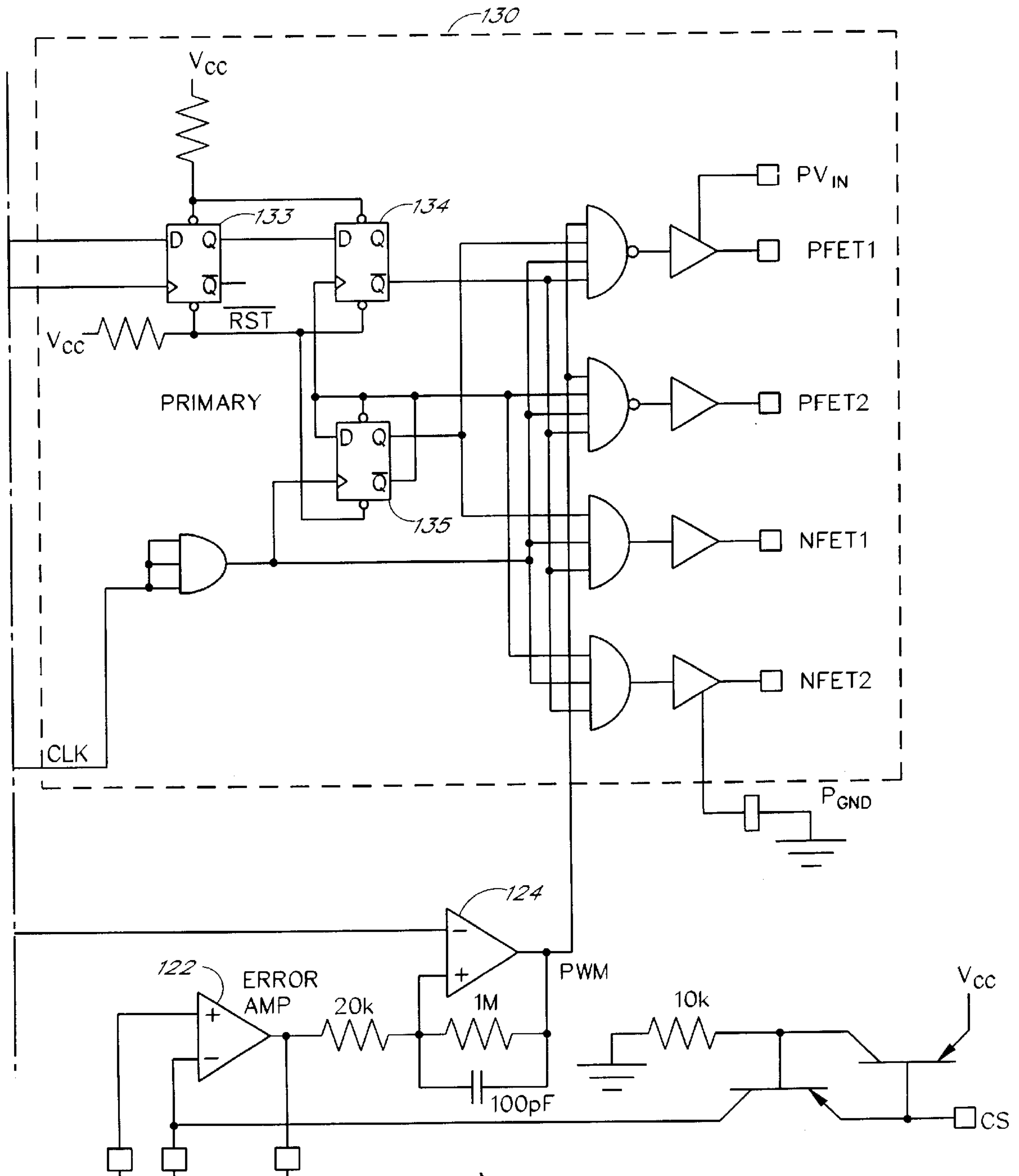
FIGS. 4A and 4B, is a schematic diagram of the controller shown in FIG. 2.
Figure 4:
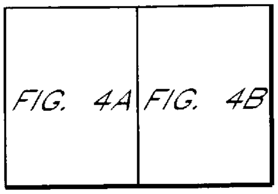
FIG. 4, comprising
Figure 4A:
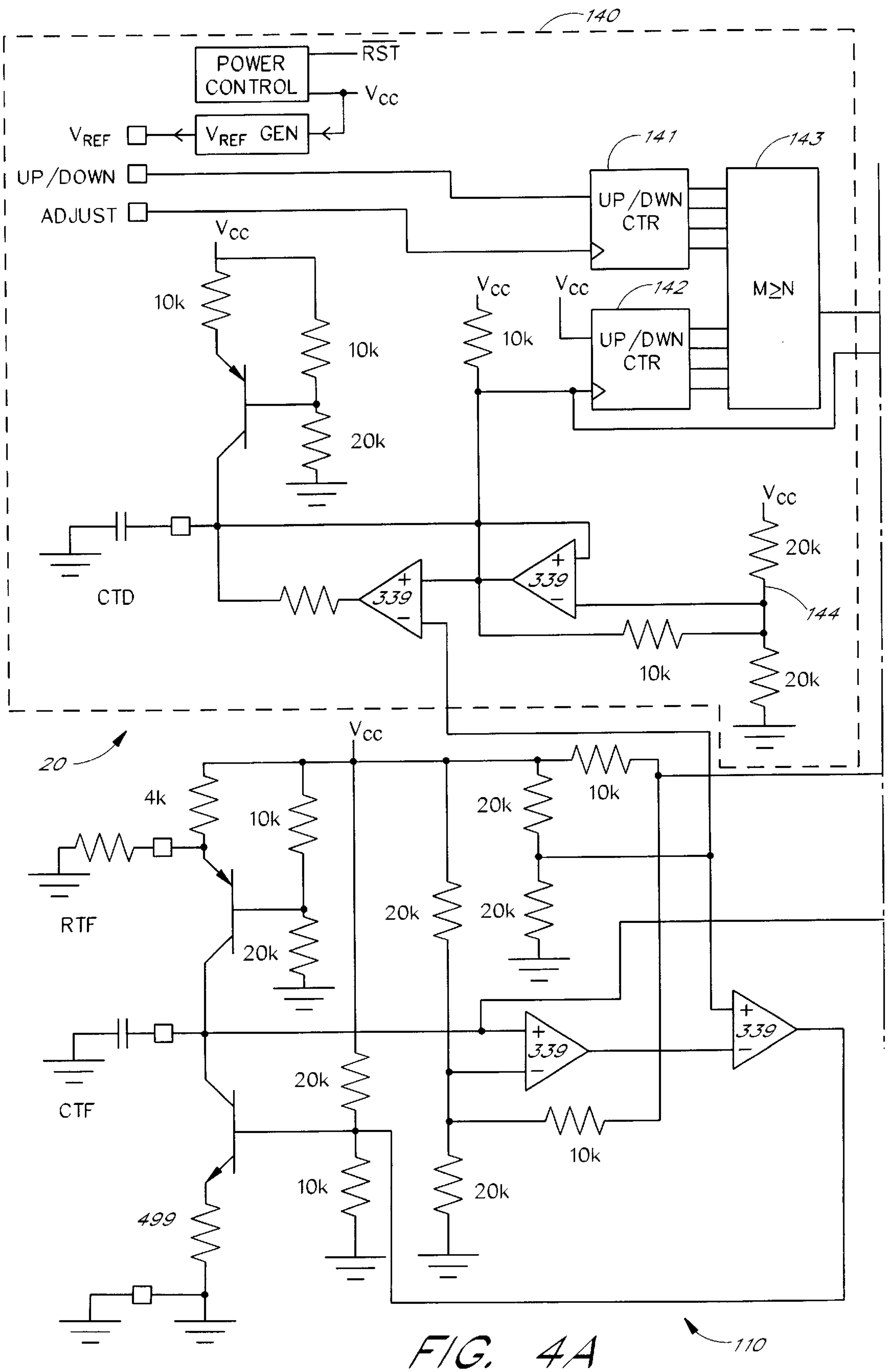

As illustrated in FIGS. 3 and 4, the controller 20 comprises a clock oscillator 110, a signal generation circuit 130, a pulse width modulation circuit 120, a dimming control circuit 140 and a secondary oscillator 144.

The clock oscillator 110 is a fixed frequency oscillator which generates a clock signal CLK (shown in FIG. 5A) which is provided to the signal generation circuit 130. The clock oscillator 110 operates at twice the frequency of the direct drive network 40 and is coupled to the signal generation circuit 130 to provide the fundamental frequency of operation for the pulses of P1, P2, N1 and N2. The frequency of the clock oscillator 110 (e.g., 120 KHz) is determined by the value of an external resistor RTF and the value of an external capacitor CTF.

Figures 5A, 5B, 5C, 5D, 5E, 5F, 5G, 5H:
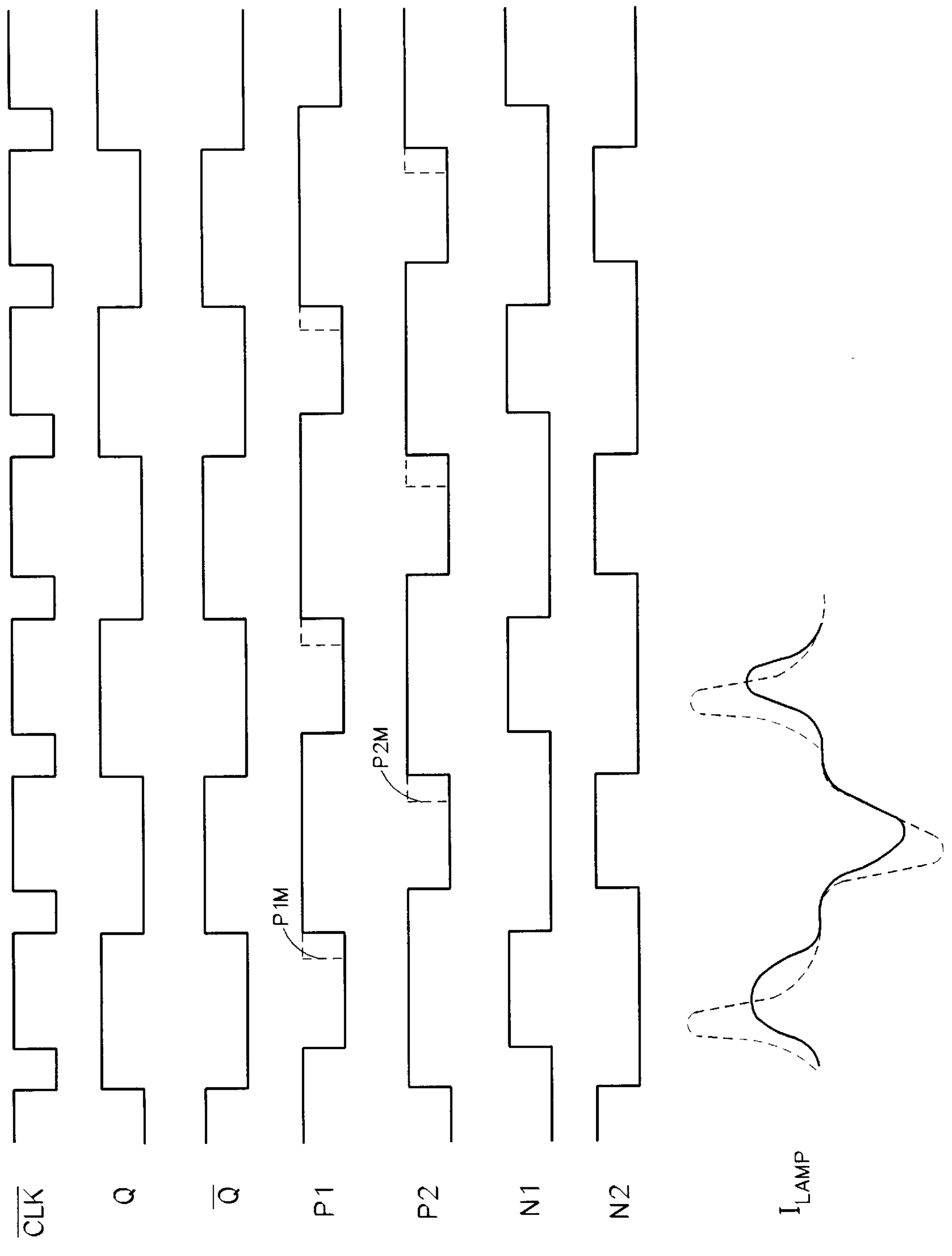
FIGS. 5A–5H, illustrates timing diagrams which show the waveforms of various signals in the power conversion circuit of FIG. 1.

The output of the pulse width modulation circuit 120 is coupled to the signal generation circuit 130 to provide a pulse width modulation signal PWM to the signal generation circuit 130 to modulate the duty cycle of the transistor drive signals P1 and P2 shown in FIGS. 5D and 5E. The pulse width modulation circuit 120 is coupled to a current sense input CS which is provided to an error amplifier 122. The error amplifier 122 sets the current for the CCFL by comparing the signal provided at the current sense input CS pin to an external reference provided at ISET. A pulse width comparator 124 sets the trailing edge of the low phases of the P1 and P2 drive signals by providing the PWM signal to the signal generation circuit 130. In particular, as the sensed current increases with respect to the ISET reference signal, the PWM signal occurs earlier in each clock cycle to turn off the P1 and P2 drive signals earlier in each clock cycle.

The dimming control circuit 140 which controls the dimming of the CCFL 5 is illustrated in more detail in FIG. 4. The dimming control circuit 140 includes two HC393 synchronous binary counters 141, 142 (available from Harris Semiconductor, or the like) and an HC85 four-bit comparator 143 (also available from Harris Semiconductor, or the like) which compares the outputs of the two counters 141, 142. The clock input of the counter 142 is coupled to the secondary oscillator 144 which operates at a frequency which is preferably set below ten KHz as determined by an external capacitor CTD. Whenever the output value of the counter 142 equals or exceeds the output value of the counter 141, the output of the comparator 143 is high. The high value is coupled via a first flip-flop 133 operating in synchronism with the secondary oscillator 144 and via a second flip-flop 134 operating in synchronism with the clock oscillator 110 to the P1, P2, N1 and N2 drive circuits. Whenever the output of the comparator 143 is high, the P1, P2, N1 and N2 outputs are all inactivated to turn off the CCFL until the output value of the counter 141 again returns to zero. By loading a digital value into counter 141 through the up/down input and the clock input of counter 141 (e.g., from a front panel control (not shown) of the computer (not shown), the duty cycle of the P1, P2, N1 and N2 drive signals can be altered to provide dimming control. The dimming control circuit 140 and the secondary oscillator 144 provide dimming control by shutting the CCFL off for a number of clock cycles. This is in contrast to the operation of the pulse width modulation circuit which varies the duration of the P1 and P2 signals during each clock cycle. Alternatively, the dimming control circuit 140 may be eliminated, and the dimming can be provided by applying an analog control to the ISET input. By altering the value of the signal applied at the ISET input, the maximum current provided to the CCFL 5 is controlled to thereby control the dimming of the CCFL 5 by varying the pulse widths of the P1 and P2 signals during each clock cycle.

The signal generation circuit 130 receives control signals from the clock oscillator 110, the pulse width modulation circuit 120 and the dimming control circuit 140 to modulate the transistor drive signals at the outputs PFET1, PFET2, NFET1 and NFET2. Preferably, the transistor drive signals P1 and P2 (shown in FIGS. 5D and 5E) drive the PFET transistors while the N1 and N2 drive signals (shown in FIGS. 5F and 5G) drive the NFET transistors. In general, the signal generation circuit 130 responds to the PWM signal from the pulse width modulation circuit 120 to modulate the low phase of the P1 and P2 drive signals as shown in FIGS. 5D and 5E, and responds to the output of the dimming control circuit 140 to temporarily deactivate the P1, P2, N1 and N2 signals. The "Q" and "$\overline{Q}$" outputs of a flip-flop 135 of the signal generation circuit 130 are shown in FIGS. 5B and 5C. The low phases of the P1 and P2 drive signals will turn on the PFET transistors 42 and 43 (shown on FIG. 2) so that the current through the CCFL will be higher if the durations of the low phases of the P1 and P2 transistor drive signals become longer. Inversely, the current through the CCFL 5 will be lower if the durations of the low phases of the P1 and P2 are decreased. By controlling the current through the CCFL 5, the illumination level of the CCFL is controlled. In a different manner, the dimming control circuit 140 shuts the CCFL off for short periods of time based upon the 10 kHz clock of the secondary oscillator 144. This also has the effect of dimming the CCFL.

Instead of using a pulse width modulating controller like the controller 20, a controller such as the LX1581 (available from Linfinity Microelectronics Inc. of Garden Grove, Calif.) can be used to control the current through the CCFL by pulse width modulating the power applied to the controller or by pulse width modulating the signal applied to the sleep pin of the controller as long as the lamp current amplitude and input power supply DC voltage range is limited.

As illustrated in FIG. 2, the first embodiment of the direct drive network 40 preferably comprises two PFET switching transistors 42 and 43, two NFET switching transistors 44 and 45, and a primary winding PW1 of a transformer 50. The transformer 50 also has a secondary winding SW1. The sources of the switching transistors 42 and 43 are coupled to the supply voltage VCC (which may vary from, e.g., 8 volts to 21 volts) while the sources of the switching transistors 44 and 45 are coupled to the system ground. The drains of the transistors 42 and 44 are coupled together, and the drains of the transistors 43 and 45 are also coupled together. The drains of the transistors 42 and 44 are further coupled to a first terminal of the primary winding PW1, and the drains of the transistors 43 and 45 are further coupled to a second terminal of the primary winding PW1 to form a full bridge circuit for the primary winding PW1.

The impedance of the direct drive network 40 is primarily inductive from the primary winding PW1 of the transformer 50 because the capacitive reactance in the direct drive network 40 arises principally from parasitic capacitance reflected from the secondary winding SW1, which capacitance is relatively low. While a capacitor CFIL is shown, the capacitor CFIL is not part of the direct drive network 40, and is coupled between VCC and system ground to filter the DC voltage VCC. The capacitor CFIL does not have any appreciable effect on the frequency of operation of the direct drive network 40. Therefore, the direct drive network 40 is a low Q circuit (e.g., a Q about 0.5 or less) and has a primarily inductive reactance.

As shown in FIGS. 5D–5G by the transistor drive signals P1, P2, N1 and N2, when the transistor 42 is turned on (i.e., conducting), the transistor 45 is also turned on and the transistors 43 and 44 are turned off. When the transistor 43 is turned on, the transistor 44 is also turned on and the transistors 42 and 45 are turned off. Also, if the duration of the low phase of the transistor drive signals P1 and P2 is reduced by modulation (shown as P1M and P2M in dashed lines in FIG. 5D and 5E), the amplitude of the current through the CCFL is also reduced to thereby reduce the illumination level of the CCFL. On the other hand, if the duration of the low phase of the transistor drive signals P1 and P2 is increased, then the amplitude of the current through the CCFL is increased to thereby increase the illumination level of the CCFL. In addition, the duration of the low phase of the transistor drive signal P1 is shorter than the duration of the high phase of the transistor drive signal P2, and the duration of the low phase of the transistor drive P2 is shorter than the duration of the high phase of the transistor drive signal P1. The situation is reversed for the transistor drive signals N1 and N2. The duration of the high phase of the respective transistor drive signal is shorter than the duration of the low phase of the other transistor drive signal. The above-described timing for the transistor drive signals P1, P2, N1 and N2 allows for one pair of transistors to be turned off completely before the other pair is turned on. For example, the transistors 42 and 45, which form a pair, are turned off completely before the transistors 43 and 44, which form the other pair, are turned on.

Because of the above operation and because the direct drive network 40 is a low Q circuit, the voltage across the primary winding PW1 is substantially a rectangular wave. However, the inductance of the transformer 50 is sufficiently high to cause the resultant voltage induced across the secondary winding SW1 to be substantially sinusoidal as shown in FIG. 5H by the signal $I_{LAMP}$. Thus, the current for the CCFL 5 is substantially sinusoidal without requiring external components (e.g., additional inductors and capacitors) on the primary, which components would be needed in a high Q drive circuit. The transformer 50 converts the DC voltage from the switching transistors into substantially a sinusoidal AC voltage and provides a substantially sinusoidal current to the CCFL 5.

The secondary network 50 comprises the secondary winding SW1 of the transformer 50, an external ballasting capacitor CB and a connector connected to the CCFL 5. The ballasting capacitor CB is coupled between one terminal of the secondary winding SW1 and the connector. The other terminal of the secondary winding SW1 is coupled to the feedback circuit 80. The two terminals of the CCFL 5 are coupled to the connector. As stated previously, the primary winding PW1 is magnetically coupled to the secondary winding SW1 so that the current for the CCFL is also substantially sinusoidal. Furthermore, to provide line voltage regulation, the ratio of the transformer windings PW1 and SW1 should be set to provide maximum output current at the minimum permitted input supply voltage (e.g., 8 volts) with the maximum drive pulse widths at the nominal frequency of operation. Such ratio of the transformer windings permits the control loop to reduce drive pulse width when the current amplitude is decreased and/or line voltage is increased to regulate lamp brightness so that the efficiency of the circuit is improved.

The feedback circuit 80 comprises a diode 82, a diode 83, a resistor 84, a resistor 86 and a capacitor 85. The anode of the diode 82 and the cathode of the diode 83 are connected to the secondary direct drive circuit 60. The cathode of the diode 82 is coupled to respective first terminals of the resistor 84, the resistor 86 and the capacitor 85. The respective second terminals of the resistor 84 and the capacitor 85 are connected to ground. The second terminal of the resistor 86 is connected to the current sense input (CS) of the controller 20. The anode of the diode 83 is connected to ground. The diodes 82 and 83 complete an AC path from the secondary winding SW1 of the transformer 50 through the CCFL 5. In addition, the diode 82 operates to provide a half-wave rectification of the AC signal on the winding across the resistor 84 and the capacitor 85 to thereby generate a filtered DC voltage across the resistor 84 and the capacitor 85 which is responsive to the current in the secondary direct drive circuit 60 which passes through the CCFL 5. This half-wave rectified voltage is provided as a feedback voltage to the current sense input pin CS of the controller 20 via the resistor 86. As described above, the controller 20 is responsive to the feedback voltage to modulate the transistor drive signals to thereby control the current through the lamp 5.

Figure 6:
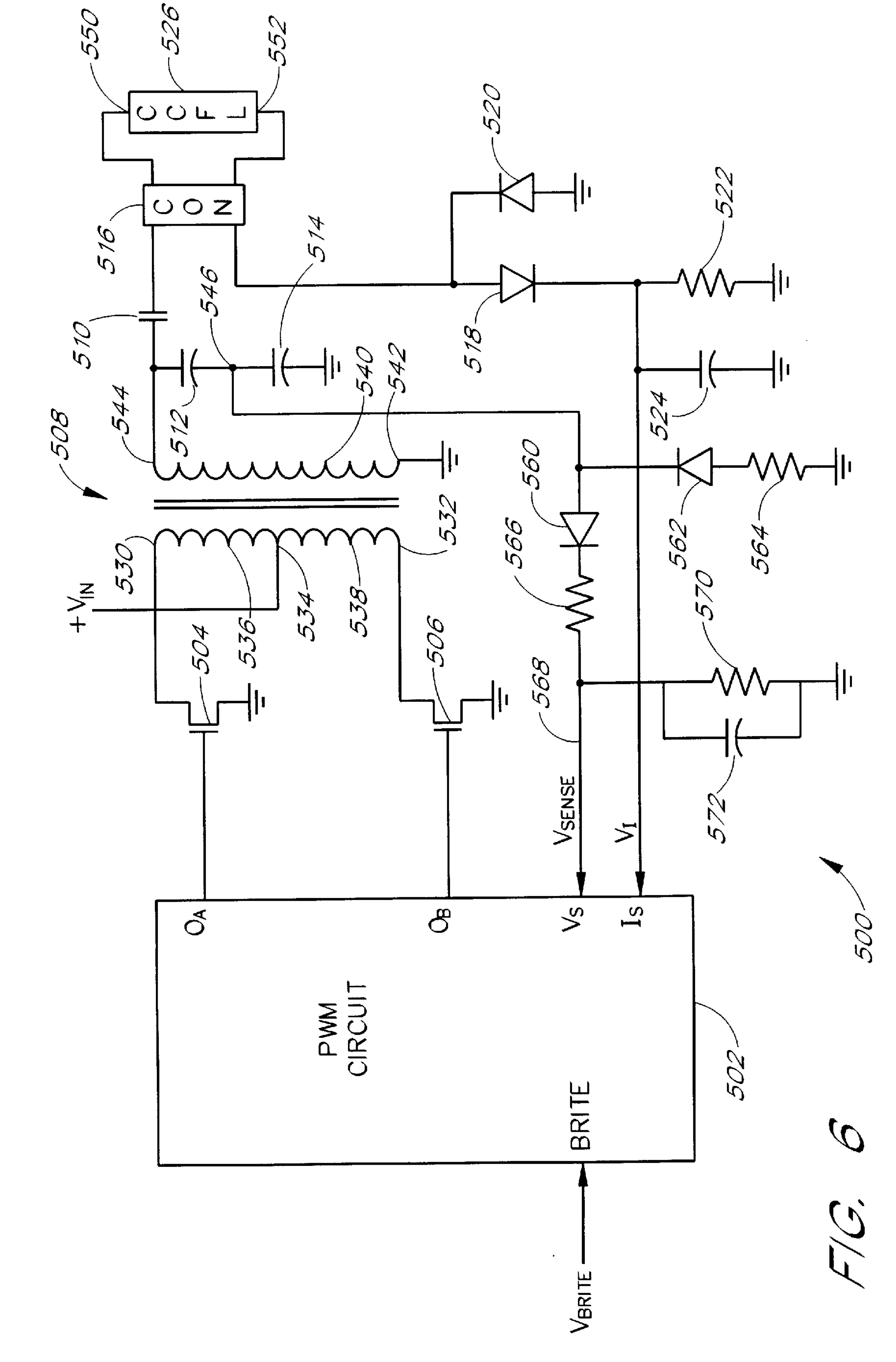
FIG. 6 is a block diagram of a second embodiment of the present invention which further reduces the number of components in the power conversion circuit.

FIG. 6 illustrates a further embodiment of the present invention in which only two transistors are needed to drive the primary winding of the transformer. In particular, FIG. 6 illustrates a drive circuit 500 which comprises a pulse width modulation (PWM) circuit 502, a first switching transistor 504, a second switching transistor 506, a transformer 508, a DC blocking capacitor 510, a first voltage divider capacitor 512, a second voltage divider capacitor 514, a connector 516, a first diode 518, a second diode 520, a current sensing resistor 522 and a current sensing filter capacitor 524. A cold cathode fluorescent lamp (CCFL) 526 is connected to the drive circuit 500 via the connector 516.

As illustrated, the first switching transistor 504 is an N-channel field-effect transistor (FET) which has its gate connected to a first output ($O_A$) of the PWM circuit 502, which has its source connected to ground and which has its drain connected to a first terminal 530 of the primary of the transformer 508. The second switching transistor 506 is also an N-channel FET which has its gate connected to a second output ($O_B$) of the PWM circuit 502, which has its source connected to ground and which has its drain connected to a second terminal 532 of the primary of the transformer 508. The primary of the transformer 508 has a centertap 534 to provide an upper winding primary 536 between the terminal 530 and the centertap 534 and a lower primary winding 538 between the terminal 532 and the centertap 534. The centertap 534 is connected to a source ($+V_{IN}$) of DC power, which may vary from approximately 8 volts to approximately 21 volts.

Figures 7A, 7B:
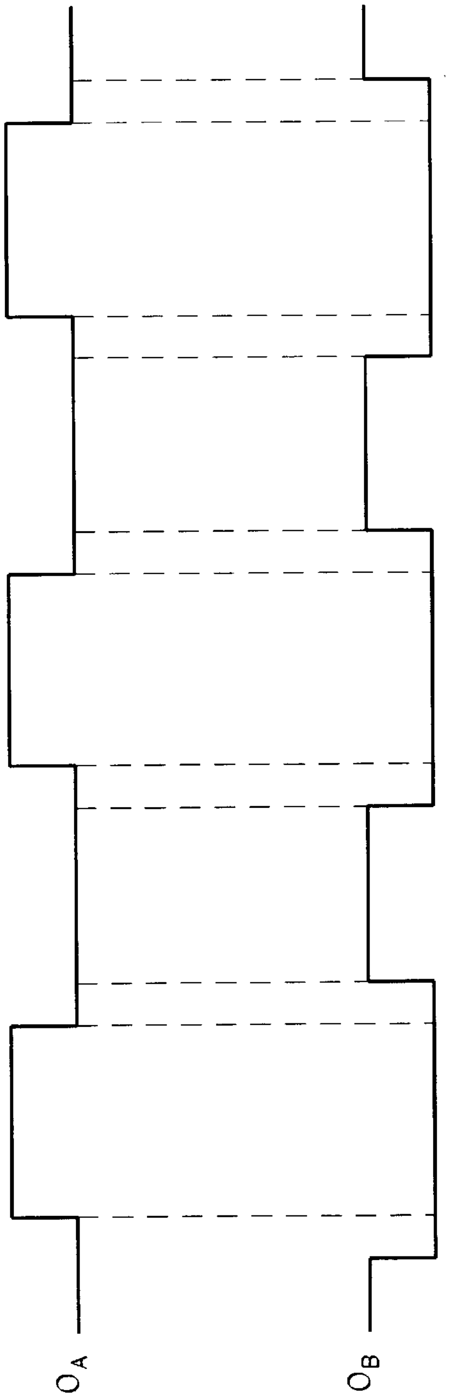
FIGS. 7A and 7B, illustrates the voltage waveforms of the switching transistor drive signals generated by the PWM circuit of FIG. 6.

In operation, a high voltage signal on the gate of the transistor 504 or on the gate of the transistor 506 will turn on the respective transistor and provide a conductive path from the respective terminal of the primary winding, through the transistor to ground. Specifically, when the output $O_A$ is high, the transistor 504 conducts, and a current flows from the voltage source $+V_{IN}$ through the centertap 534 and the upper winding 536 to the terminal 530. When the output $O_B$ is high, the transistor 506 conducts, and a current flows from the voltage source $+V_{IN}$ through the centertap 534 and the lower winding 538 to the terminal 532. Thus, by alternately switching the transistors 504 and 506 on, as illustrated by the signal waveform $O_A$ in FIG. 7A and the signal waveform $O_B$ in FIG. 7B, a current is caused to flow in the primary windings 536, 538, first in one direction from the centertap 534 through the upper winding 536, and then in the opposite direction from the centertap 534 through the lower winding 538. As further illustrated in FIGS. 7A and 7B, the signals $O_A$ and $O_B$ are timed such that both signals are never active high at the same time.

The transformer 508 has a secondary winding 540 which has a first terminal 542 connected to ground and a second terminal 544 connected to a first terminal of the DC blocking capacitor 510 and to a first terminal of the first voltage divider capacitor 512. A second terminal of the first voltage divider capacitor 512 is connected to a node 546. A first terminal of the second voltage divider capacitor 514 is also connected to the node 546. A second terminal of the second voltage divider capacitor 514 is connected to ground. As will be discussed below, a sense voltage ($V_{SENSE}$) is developed on the node 546. The node 546 is connected via a line 548 to a voltage sense input ($V_S$) input of the PWM circuit 502. In the preferred embodiment, the first voltage divider capacitor 512 has a capacitance of approximately 1.3 picofarads, and the second voltage divider capacitor 514 has a capacitance of approximately 470 picofarads. Thus, the sense voltage on the node 546 will have a voltage which is approximately 0.3 percent of the voltage across the secondary winding 540.

The DC blocking capacitor 510 couples the current generated in the secondary winding 540 to the connector 516 and thus to a first terminal 550 of the CCFL 526. A second terminal 552 of the CCFL 526 is coupled via the connector 516 to the anode of the first diode 518 and to the cathode of the second diode 520. The anode of the second diode 520 is connected to ground. The anode of the first diode 518 is connected to a first terminal of the current sensing resistor 522. A second terminal of the current sensing resistor 522 is connected to ground. In one particular embodiment, the current sensing resistor 522 has a value of approximately 953 ohms.

The first diode 518 operates as a half-wave rectifier such that a current sense voltage $V_I$ develops across the resistor 522 and the filter capacitor 524 responsive to the current through the CCFL 526 when the current flows from the terminal 544 of the secondary winding, through the DC blocking capacitor 510, through the CCFL 526, through the diode 518 and the resistor 522 to ground, and then to the terminal 542. The current sense voltage is provided as an input to a current sense input ($I_S$) of the PWM circuit 502.

The second diode 520 provides a current path for the alternate half-cycles when the current flows out of the terminal 542 to ground, through the second diode 520, through the CCFL 526, through the DC blocking capacitor 510 and to the terminal 544.

The embodiment of FIG. 6 operates in a similar manner to the previously described embodiment. The PWM circuit 502 monitors the current via the current sense input $I_S$ and varies the pulse width modulation applied to the first and second switching transistors 504, 506. That is, if the sensed current is less than a desired current, then the transistors 504, 506 are turned on for a greater duration in each cycle to increase the total current provided to the lamp 526. Conversely, if the sensed current is greater than a desired current, then the transistors 504, 506 are turned on for a shorter duration in each cycle to decrease the current provided to the lamp 526.

The amount of desired current and hence the brightness of the lamp 526 may be adjusted by varying a reference voltage to which the current sense voltage $V_I$ is compared. The reference voltage $V_{BRITE}$ is applied to a BRITE input of the PWM circuit 502 and is compared internally to the current sense voltage $V_I$ applied to the $I_S$ input. By increasing the reference voltage $V_{BRITE}$, the desired current is increased and hence the brightness of the lamp 526 is increased. Similarly, by decreasing the reference voltage $V_{BRITE}$, the desired current and brightness are decreased. The reference voltage $V_{BRITE}$ is preferably an analog voltage generated within the notebook computer (not shown) or other device into which the present invention is incorporated.

The first and second voltage divider capacitors 512, 514 provide an overvoltage protection circuit for the drive circuit 500. The voltage on the node 546 is provided to the anode of a third diode 560 and the cathode of a fourth diode 562. The anode of the fourth diode 562 is connected to ground via a resistor 564. The cathode of the third diode 560 is connected to a node 568 via a resistor 566. The node 568 is connected to ground via a resistor 570 in parallel with a capacitor 572. The third diode 560 operates as a half-wave rectifier to generate a $V_{SENSE}$ voltage across the resistor 570 which is responsive to the voltage across the secondary 540 of the transformer 508. The $V_{SENSE}$ voltage is applied to the $V_S$ input of the PWM circuit 502 and operates as a shutdown voltage to prevent the voltage across the secondary 540 of the transformer 508 from becoming to great. In particular, when the $V_{SENSE}$ voltage across the second resistor 570 exceeds a particular amount which is greater than approximately the voltage across two internal series connected diodes within the PWM circuit 502. When that voltage is exceeded, an internal signal is applied to the pulse width modulator within the PWM circuit to reduce the durations of the active signals generated at the outputs $O_A$ and $O_B$, thus reducing the duration of the input currents applied to the primary windings 536, 538 of the transformer 508. Thus, for example, if the voltage across the secondary winding 540 of the transformer 508 increases as the impedance of the CCFL 526 increases with age or if the CCFL 526 is disconnected or broken, the $V_{SENSE}$ voltage provided by the voltage divider capacitors 512, 514 limits the maximum voltage generated across the secondary winding 540.

In addition to limiting the output voltage, the $V_{SENSE}$ feedback to the PWM modulator 502 regulates the output voltage to a specifically set voltage value when the CCFL 526 is unstruck or missing. The regulation maintains the required lamp strike voltage with respect to variable load impedance which is normally parasitic capacitance (typically on the order of 10–40 picofarads) in the lamp wiring and mounting hardware. The load impedance can vary from application to application and can vary sufficiently to prevent lamps from striking.

Figure 8A:
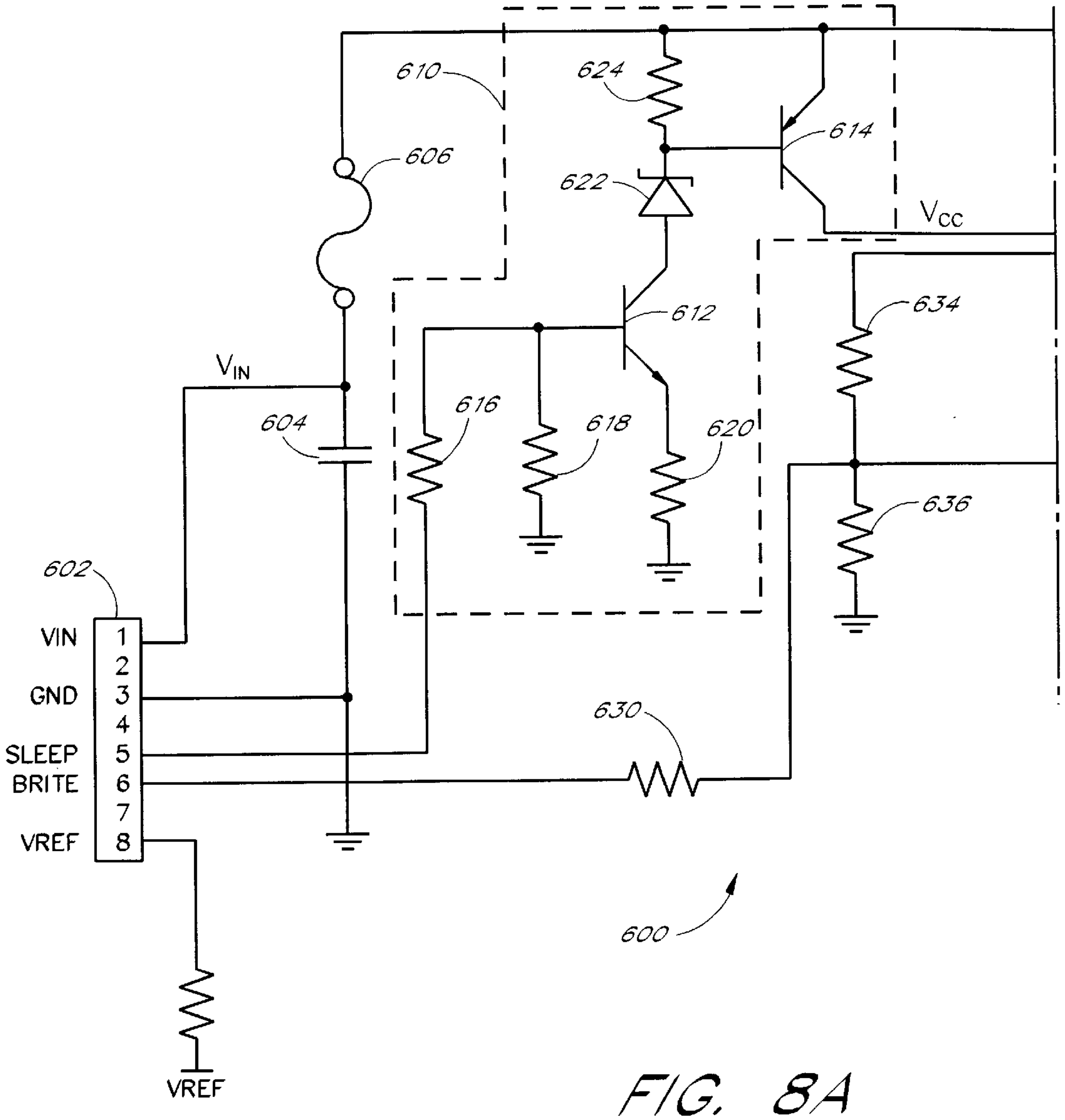
FIGS. 8A–8D, is a more detailed circuit diagram of the embodiment of FIG. 6 illustrating additional circuitry which implements an improved lamp striking feature.
Figure 8:
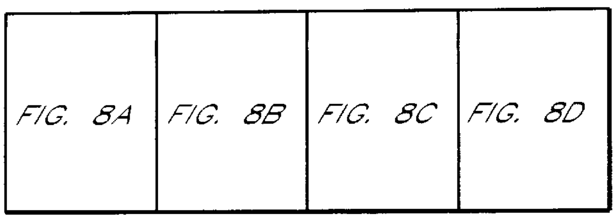
FIG. 8, comprising
Figure 8B:
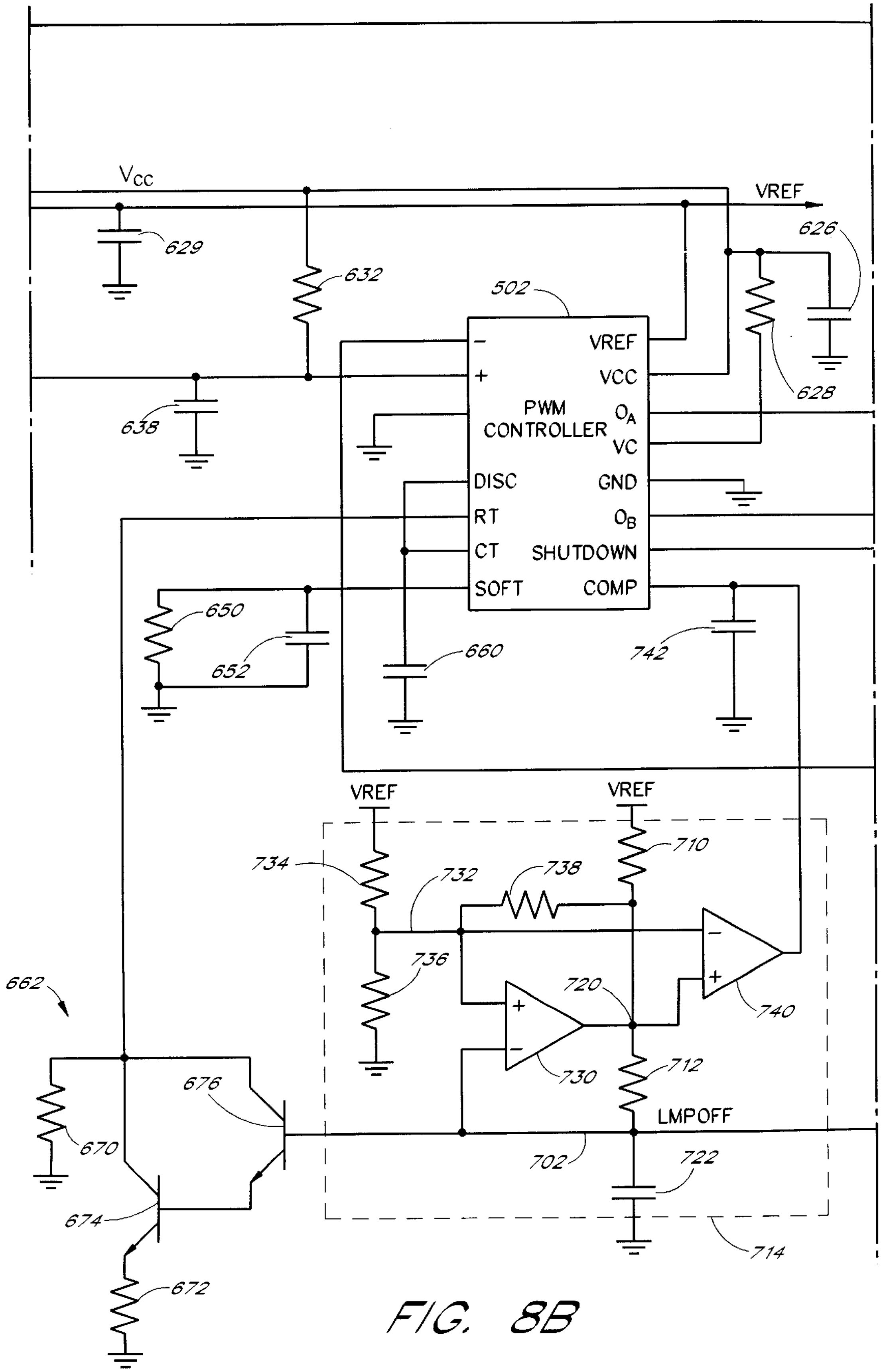
Figure 8C:
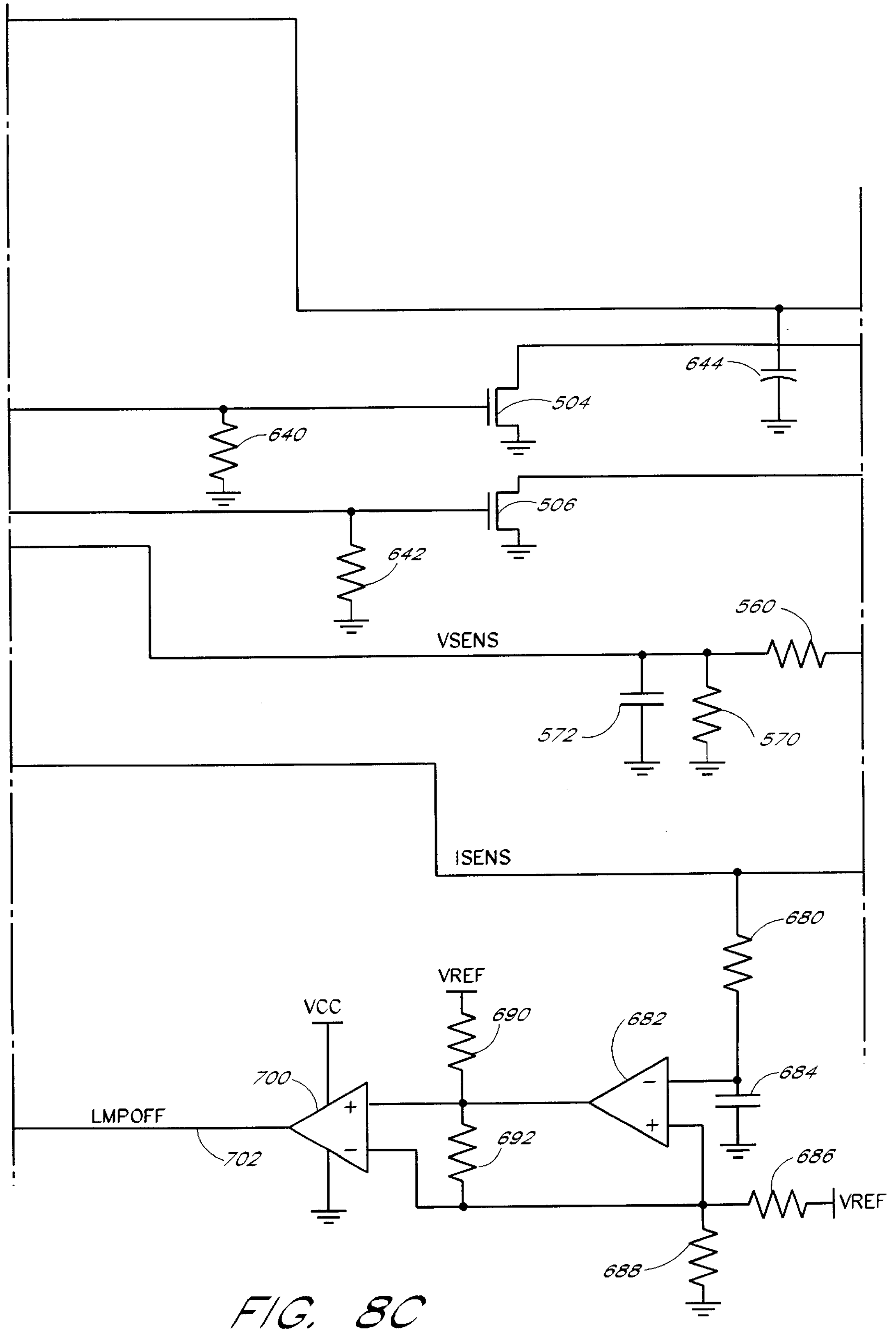
Figure 8D:
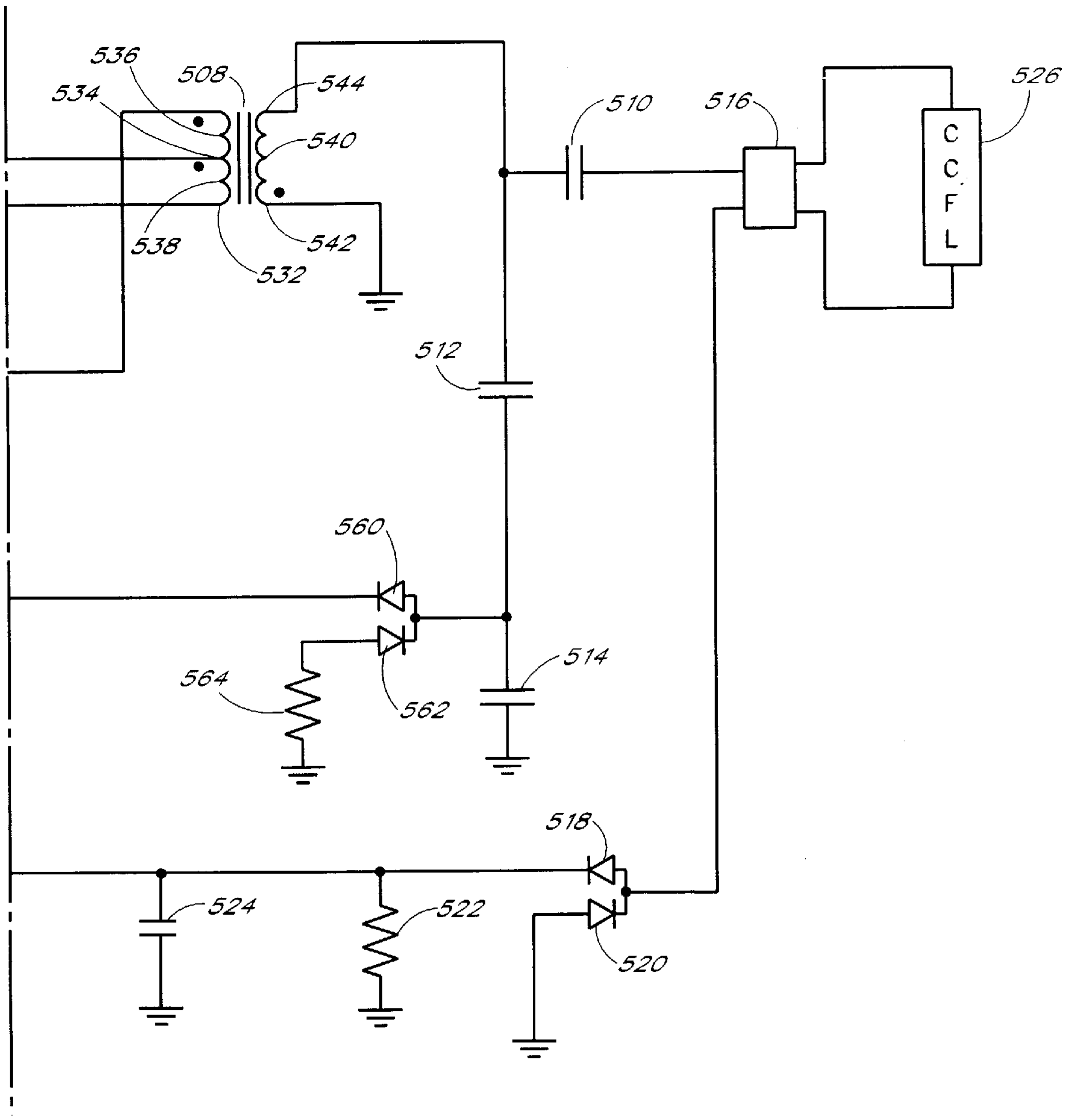

FIG. 8 illustrates a particularly preferred embodiment of a drive circuit 600 in accordance with the present invention. The drive circuit 600 of FIG. 8 is similar to the drive circuit 500 of FIG. 6, and like elements have been identified with like numbers.

The drive circuit 600 of FIG. 8 advantageously provides a lamp striking mode of operation in which the voltage of the driver circuit is temporarily increased when the CCFL 526 is not operating and no current is flowing. By increasing the voltage, the CCFL 526 can be caused to strike and draw current. When current through the CCFL 526 is sensed, the voltage is then lowered to a normal operating voltage. The voltage is caused to increase by temporarily increasing the operating frequency of the PWM circuit 502. After the CCFL 526 has struck, the voltage is returned to normal by lowering the operating frequency to the normal operating frequency.

A first connector 602 is provided to interconnect the drive circuit 600 with another device, such as, for example, a notebook computer (not shown). The drive circuit 600 receives a voltage input $V_{IN}$ which may be a DC voltage between approximately 8 volts and approximately 21 volts. A conventional filter capacitor 604 filters the input voltage. A fuse 606 protects the drive circuit 600 in the event of excess current.

A sleep circuit 610 comprises an NPN transistor 612 and a PNP transistor 614. A resistor 616 connects the base of the NPN transistor 612 to a SLEEP input terminal on the connector 602. A resistor 618 connects the base of the NPN transistor 612 to ground to pull the base low if the SLEEP input is not connected to an active voltage level. A resistor 620 connects the emitter of the NPN transistor 612 to ground. The collector of the NPN transistor 612 is connected to the base of the PNP transistor 614 via a zener diode 622. The base of the PNP transistor 614 is pulled up to the input voltage $V_{IN}$ via a resistor 624. The emitter of the PNP transistor 614 is connected to the input voltage $V_{IN}$. The collector of the PNP transistor 614 is a switched supply voltage VCC. When the SLEEP input signal is high, the NPN transistor 612 is turned on and the base of the PNP transistor 614 is pulled low to turn on the PNP transistor 614 to connect the switched supply voltage VCC to $V_{IN}$ and to thereby provide voltage to the PWM controller 502. When the SLEEP input signal is pulled low, then the NPN transistor 612 and the PNP transistor 614 are turned off to disconnect the switched supply voltage VCC from the input voltage $V_{IN}$, thereby disabling the controller 502. The SLEEP input thereby provides a way of turning off the power to the CCFL 526.

The switched supply voltage VCC is filtered by a capacitor 626 which may represent multiple capacitors. The switched VCC voltage is provided as a separate supply voltage to a VC input to the PWM controller 502 via a resistor 628. The VC voltage input provides current to the output drivers within the PWM controller 502.

The PWM controller 502 generates an internal reference voltage (VREF) which is provided as an output from the PWM controller 502 to provide a stable reference voltage for other components in the drive circuit 600. A capacitor 629 provides filtering for the reference voltage.

In the preferred embodiment, the PWM controller 502 is an SG1525 regulating pulse width modulator, available from Silicon General (now Linfinity Microelectronics Inc.) of Garden Grove, Calif., or an equivalent thereof available from a number of industry sources. The operation of the PWM controller 502 was described in part above in connection with FIG. 6. Other aspects of the operation of the PWM controller 502 are described below.

As discussed above in connection with FIG. 6, the PWM controller 502 has a brightness control input (+) which is continuously compared to the current sense voltage across the resistor 570 which is input to the PWM controller 502 via a current sense input (–). The brightness input is provided from the BRITE input of the connector 602 via a resistor 630 to the control input (+). A resistor network is also connected to the control input (+). The resistor network comprises a resistor 632 connected between the control input (+) and the switched supply voltage VCC, a resistor 634 connected between the control input (+) and a reference voltage output (VREF) of the PWM controller 502, and a resistor 636 between the control input (+) and ground. The resistor network biases the control input (+) so that when an analog signal on the BRITE input has a value of approximately 0 volts, the PWM controller provides a minimum pulse width output for minimum brightness and so that when the signal on the BRITE input has a value of approximately 2.5 volts, the PWM controller 520 provides a maximum pulse width output for maximum brightness. A capacitor 638 connected between the control input (+) and ground suppresses noise on the control input (+) to suppress unwanted fluctuations in the brightness of the CCFL 526. The resistor 632 is included to provide forward compensation to keep the CCFL 526 brightness constant with increasing $V_{IN}$ voltage which causes an increased crest factor of the lamp current. By effectively increasing the brightness input applied to the control input (+), an increased current is generated to compensate for the decreased efficiency of the CCFL as a result of the increased crest factor.

As set forth above, the output $O_A$ is a rectangular wave signal which drives the gate of the first FET 504. A pulldown resistor 640 is connected between the gate of the first FET 504 and ground to assure that the first FET 504 is turned off when the output $O_A$ is not active (e.g., when the PWM controller 502 is deactivated by the SLEEP input). Similarly, the output $O_B$ is a rectangular wave signal which drives the gate of the second FET 506. A pulldown resistor 642 is connected between the gate of the second FET 506 and ground to assure that the second FET 506 is turned off when the output $O_B$ is not active (e.g., when the PWM controller 502 is deactivated by the SLEEP input).

The transformer 508 is connected as described above in connection with FIG. 6. Note that a capacitor 644 is advantageously connected between the $+V_{IN}$ supply voltage and ground proximate to the centertap 534.

The operation of the switching transistors 504, 506, the transformer 508, the DC blocking capacitor 510, the two didoes 518, 520 and the resistor 522 in providing operational current to the CCFL 526 was described above in connection with FIG. 6 and will not be repeated. Similarly, the basic current sensing and voltage sensing circuitry operates in the same manner and will not be described again.

In FIG. 8, the timing components connected to the PWM controller 502 are shown in detail in order to illustrate the lamp striking feature of the present invention.

The PWM controller 502 includes a softstart (SOFT) input which is connected to ground through a parallel combination of a resistor 650 and a capacitor 652. When power is first applied to the PWM controller 502, the capacitor 652 is initially discharged and gradually charges. The voltage across the capacitor 652 is applied to the softstart input which is connected internally to the pulse width modulator. While the softstart input voltage is relatively low, the softstart input voltage controls the maximum pulse widths generated by the pulse width modulator. When the softstart input voltage reaches its maximum value, it no longer affects the pulse widths.

The operational frequency of the PWM controller 502 is determined by a capacitor 660 connected to a timing capacitor (CT) input and to a discharge (DISC) output of the PWM controller 502 and by a variable resistance circuit 662 connected to a timing resistor (RT) input to the PWM controller 502. For a fixed frequency operation, a fixed resistor is connected to the timing resistor input, as illustrated by a resistor RTF in FIG. 2. In FIG. 8, the resistance network 662 comprises a first resistor 670 connected between the RT input and ground and further comprises a second resistor 672 between the RT input and ground via an NPN transistor 674. An NPN transistor 676 has an emitter connected to the base of the transistor 674 and has a collector connected to the collector of the transistor 674. The transistor 674 and the transistor 676 operate as a Darlington transistor pair such that when a positive voltage is applied to the base of the transistor 676, the transistor 674 conducts to cause the resistor 672 to conduct current in parallel with the resistor 670, thus reducing the effective resistance of the resistance network 662. By varying the voltage on the base of the transistor 676, the current flow through the resistor 672 is varied to thereby effectively vary the resistance of the resistance network 662. The operating frequency of the PWM controller 502 is determined by the capacitance of the capacitor 660 and the resistance applied to the RT input. Thus, by varying the resistance of the network 662, the frequency of operation is varied. For example, in the preferred embodiment, the capacitor 660 has a capacitance of 0.001 microfarad, the resistor 670 has a resistance of 11,800 ohms, and the resistor 672 has a resistance of 4,990 ohms. Thus, by varying the base voltage of the transistor 676 from a fully off voltage to a fully on voltage, the frequency of operation of the PWM modulator 502 can be varied from approximately 60 kHz to approximately 120 kHz.

The operating frequency of the PWM controller 502 is normally maintained at a generally constant frequency of approximately 60 kHz. However, when the CCFL 526 does not strike and thus does not draw current and illuminate, it has been found to be sometimes necessary to increase the voltage across the CCFL 526 in order to cause the CCFL 526 to strike. A number of techniques have been used to cause a CCFL to strike; however, the unique circuitry of the drive circuit 600 provides a particularly elegant apparatus and method for causing the CCFL 526 to strike. In particular, because the drive circuitry connected to the primary windings 536, 538 of the transformer 508 consists solely of the two transistors 504, 506 and does not include any resonant components, the primary 508 can be readily driven at a wide range of frequencies. On the other hand, as the frequency of the pulses applied to the primary winding of the transformer 508 increases when the secondary winding is effectively an open circuit before the CCFL 526 strikes, the frequency approaches the open-circuit, self-resonant frequency of the transformer 508. As the frequency approaches the self-resonant frequency, the output voltage across the secondary of the transformer increases. Thus, by gradually increasing the frequency of the drive pulses, the transformer secondary output voltage is increased accordingly and can thereby be increased to cause the CCFL 526 to strike. The control circuit illustrated in FIG. 8 and described below causes the operating frequency to be periodically increased until the CCFL 526 strikes.

As discussed above, a voltage is developed across the resistor 522 which is responsive to the current flowing through the CCFL 526 and which is used to control the pulse widths to control the current. In FIG. 8, the current sense voltage across the resistor 522 is applied via a resistor 680 to an inverting (–) input of a comparator 682, such as, for example, an LM339 comparator available from National Semiconductor, or the like. A capacitor 684 is connected between the inverting input and ground to suppress rapid changes in the voltage on the inverting input. The noninverting (+) input of the comparator 682 is connected to the common node of a voltage divider network comprising a resistor 686 connected from the common node to the reference voltage (VREF) and a resistor 688 connected from the common node to ground.

The comparator 682 has an open-collector output which is connected to a resistor network comprising a resistor 690 connected from the reference voltage (VREF) to the output of the comparator 682 and comprising a resistor 692 connected from the output of the comparator 682 to the common node between the resistor 686 and the resistor 688. During normal operation, when current is flowing through the CCFL 526, the capacitor 684 is charged to a voltage level determined by the magnitude of the current, thus causing the voltage on the inverting input of the comparator 682 to be greater than the voltage on the noninverting input. Thus, the output of the comparator 682 will be low which effectively causes the resistor 692 be connected in parallel with the resistor 688 between the common node and ground. This causes the voltage on the noninverting input to be at a minimum voltage level.

If the current flow is zero or very low such as might occur when the drive circuit 600 is first turned on, the voltage across the capacitor 684 will likewise be very low or zero causing the comparator to switch states and to disconnect the open-collector output from ground. This effectively causes the series combination of the resistor 690 and the resistor 692 to be electrically in parallel with the resistor 686 between the reference voltage (VREF) and the common node connected to the noninverting input of the comparator 682. Thus, the voltage on the noninverting input of the comparator 682 is increased substantially so that the voltage across the capacitor 684 will have to increase significantly before the comparator will again switch. This provides a hysteresis effect to prevent the comparator from switching from one level to another when the capacitor is charging or discharging.

The output of the comparator 682 is connected to the noninverting input of a comparator 700. The inverting input of the comparator 700 is connected to the common node of the resistor network and thus to the noninverting input of the comparator 682. The comparator 700 is also preferably an LM339 comparator having an open-collector output. During normal operation, when the output of the comparator 682 is low, the output of the comparator 700 is low because the voltage on the noninverting input is lower than the voltage on the inverting input. When the comparator 682 switches so that its output is pulled high by the resistor 690, the output of the comparator 700 likewise switches to disconnect the open-collector output from ground. The output of the comparator 700 is a lamp off (LMPOFF) signal on a LMPOFF signal line 702. The lamp off signal is connected to the reference voltage (VREF) by a resistor 710 connected in series with a resistor 712. The lamp off signal is held low by the comparator 700 when current is flowing through the CCFL 526 and is released from ground when no current or very little current is flowing through the CCFL 526.

The lamp off signal on the line 702 is applied to the base of the transistor 676. In its simplest form, the lamp off signal could be allowed to switch from an inactive low state to an active high state to drive the transistor 676. Thus, as described above, the effective resistance of the resistance network 682 would switch from its maximum resistance to its minimum resistance, and the operating frequency would switch from its minimum operating frequency to its maximum operating frequency. However, the maximum operating frequency may not necessarily be required to provide a sufficient voltage to strike the CCFL 526. Furthermore, operation of the transformer 508 at the maximum operating frequency and maximum secondary voltage could result in overheating of the transformer 508. Thus, a sawtooth generator circuit 714 controls the voltage applied to the transistor 676 and further provides a reduced duty cycle for the drive signals applied to the transformer 508.

The sawtooth generator 714 comprises the resistor 710 connected between the reference voltage and a common node 720 and the resistor 712 connected between the common node 720 and the LMPOFF signal line 702. A capacitor 722 is connected between the LMPOFF signal line 702 and ground. A comparator 730 has its inverting input connected to the LMPOFF signal line 702. The noninverting input of the comparator 730 is connected to a common node 732. The output of the comparator 730 is connected to the common node 720. A resistor 734 is connected from the common node 732 to the reference voltage, and a resistor 736 is connected from the common node 732 to ground. A resistor 738 is connected from the common node 732 to the common node 720. A comparator 740 has its inverting input connected to the common node 732 and has its noninverting input connected to the common node 720. The output of the comparator 740 is connected to the compensation (COMP) input of the PWM controller 502. As discussed below, the output of the comparator 740 during normal operation is high. When a low signal from the comparator 740 is applied to the compensation input of the PWM controller 502, the output drive signals of the PWM controller 502 are turned off. A capacitor 742 is connected between the compensation input of the PWM controller 502 and ground to frequency compensate the COMP signal which is the output of the error amplifier contained within the PWM controller 502.

The sawtooth generator circuit performs two functions. The first function is to cause the operating frequency of the PWM controller 502 to vary by varying the effective resistance of the resistance network 662. The second function is to provide a reduced duty cycle of the PWM controller 502 when the frequency is being varied to prevent overvoltage and overheating of the transformer 508 which would happen if the transformer were allowed to operate at high frequency continuously.

When current is flowing in the CCFL 526 and the LMPOFF signal on the line 702 is low, the capacitor 722 is discharged and the inverting input of the comparator 730 is low, thus causing the output of the comparator 730 to be open. Thus, the resistor 710 pulls the output of the comparator 730 on the node 720 to a high level. The high level on the node 720 causes the noninverting input of the comparator 740 to be high, causing the output of the comparator 740 to be high, thus having no effect on the compensation input of the PWM controller 502.

The inactive open-collector output of the comparator 730 on the node 720 causes the resistor 710 and the resistor 738 to be effectively connected in parallel with the resistor 734 between the reference voltage and the node 732, thus causing the node 732 to have relatively high voltage at the noninverting input of the comparator 730 and the inverting input of the comparator 740. For example, a voltage of approximately 0.7 VREF on the node 732 is selected in one embodiment. At the same time, the node 720 has a voltage of approximately 0.8 VREF. (The resistor 712 has a resistance selected to be much greater than the resistances of the other resistors in the sawtooth generator and can be ignored in determining the voltages on the nodes 720, 722.) The sawtooth generator 714 remains stable in this condition as long as the LMPOFF signal on the line 702 is held at ground by the output of the comparator 700.

Figure 9A:
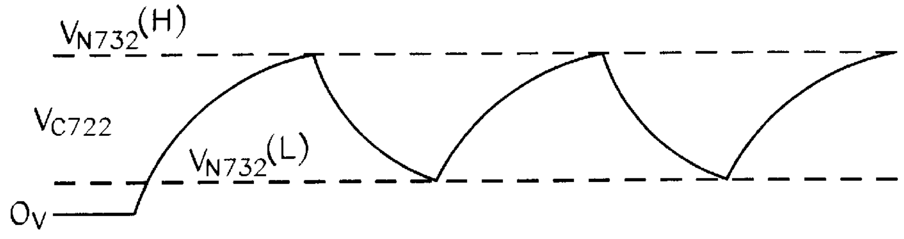
FIGS. 9A–9D, illustrates waveforms of the voltages generated by the sawtooth generator in the embodiment of FIG. 8.

The operation of the sawtooth generator 714 when the LMPOFF signal is no longer held at ground potential is illustrated by voltage waveforms in FIGS. 9A, 9B, 9C and 9D. As illustrated in FIG. 9A, a voltage $V_{C722}$ on the capacitor 722 is initially at zero volts. When the current flowing through the CCFL 526 becomes zero or very small, the output of the comparator 700 switches releasing the ground connection to the LMPOFF line 702. Thus, the capacitor 722 begins to charge via the resistor 710 and the resistor 712. As illustrated in FIG. 9A, the rising voltage on the capacitor 722 increases in accordance with the resistance-capacitance (RC) time constant of the capacitor 722 and the resistor 712 (the resistor 710 is much smaller than the resistor 712 and does not significantly affect the time constant). When the voltage on the capacitor 722 applied to the inverting input of the comparator 730 increases beyond the voltage on the noninverting input of the comparator 730 (i.e., a voltage $V_{N732}$(H) on the node 732 illustrated in FIG. 9B), the output of the comparator 730 on the node 720 switches from an initial high voltage of approximately 0.8 VREF (voltage H in FIG. 9C) to ground, and the capacitor 722 begins to discharge toward zero volts through the resistor 712.

When the output of the comparator 730 is at ground, the resistor 738 is electrically in parallel with the resistor 736 between the node 732 and ground. Thus, the resistance from the node 732 to ground is reduced and the resistance from the node 732 to the voltage reference is increased, thereby reducing the voltage at the node 732 to a lower level than its original level (e.g., to approximately 0.3 VREF) which is illustrated as a voltage $V_{732}$(L) in FIG. 9B. Because of the lower voltage level on the node 732, the capacitor 722 must discharge to a lower voltage before the comparator 730 will again switch. The switching of the voltage levels on the node 732 provides hysteresis so that a well-defined sawtooth waveform having an approximately 50 percent duty cycle is generated as illustrated in FIG. 9A.

The sawtooth voltage waveform on the capacitor 722 is applied to the base of the transistor 676, thus turning on the transistor 676 and the transistor 674. As the sawtooth voltage increases, the transistors 676, 674 conduct more current, thus increasing the current flow from the RT input of the PWM modulator 502 in the same manner as a smaller resistance on the RT input would increase current flow. The PWM modulator 502 responds to the increased current flow to increase the frequency of the output pulses on the outputs $O_A$ and $O_B$. Thus, the frequency is effectively swept from a low frequency to a high frequency. In the preferred embodiment of FIG. 8, the sawtooth waveform has a repetition rate of approximately 5–10 Hz.

If, as the operating frequency of the PWM modulator 502 is increased, the voltage output from the transformer 508 becomes sufficiently high to strike the CCFL 526, current will begin flowing and the capacitor 684 will charge to a sufficient level to cause the comparators 682 and 700 to switch. This immediately discharges the capacitor 722 and turns off the sawtooth generator 714 so that the resistance network 662 reverts to its normal resistance state.

Figure 9B:
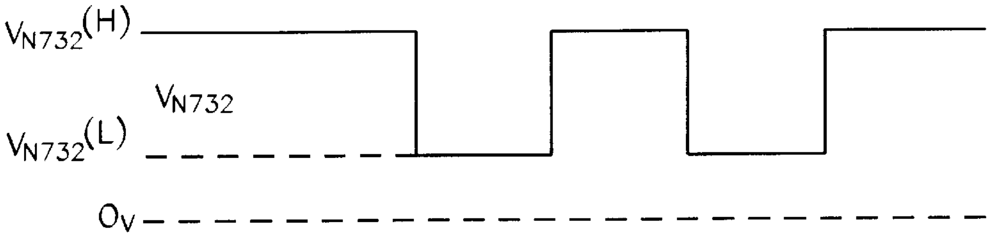
Figure 9C:
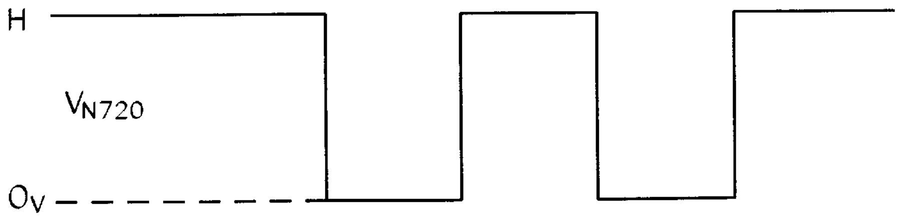
Figure 9D:
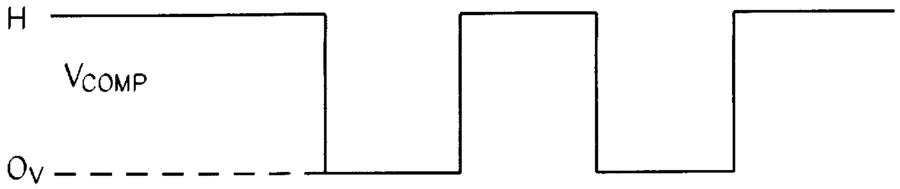

As discussed above, it is preferable to not operate the transformer 508 continuously at its maximum operating frequency and voltage. The comparator 740 connected to the compensation input prevents this operating condition by comparing the voltage on the node 720 with the voltage on the node 732. As set forth above, during normal operation when the current is flowing through the CCFL 526, the voltage on the node 720 is approximately 0.8 VREF and the voltage on the node 732 is approximately 0.6 VREF. Thus, as illustrated by an initial voltage of VREF in FIG. 9D, the output of the comparator 740 is high and has no effect on the compensation input of the PWM modulator 502. On the other hand, each time the output of the comparator 730 switches when the sawtooth generator 714 is active, the voltage on the node 720 becomes zero volts (FIG. 9C) and the voltage on the node 732 becomes approximately 0.3 volts (FIG. 9B). Thus, the voltage on the inverting input of the comparator 740 is greater than the voltage on the noninverting input, and the output of the comparator 740 switches to a low state, as illustrated in FIG. 9D, to thereby ground the compensation input of the PWM modulator 502. The grounded compensation input causes the PWM modulator 502 to disable the drive output signals $O_A$, $O_B$ to turn off the current to the transformer for approximately 50 percent of the time.

From the foregoing, it can be seen that by using a non-resonant direct drive primary circuit, the present invention reduces the number of components needed to generate drive signals for a cold cathode fluorescent lamp. In addition, because the primary circuit is not operating in a resonant mode, the operating frequency of the primary circuit can be readily increased by increasing the operating frequency of the PWM modulator to cause the transformer to generate a substantially greater voltage output to strike the lamp without requiring complex additional circuitry. Because of the unique frequency sweeping circuit which automatically shuts off when the lamp strikes, the lowest striking frequency and thus the lowest striking voltage can be obtained for any particular lamp. Thus, unnecessary overvoltages are not applied to lamps which do not require a high voltage while providing sufficient voltage for lamps requiring higher voltages to start. A major advantage of this technique is to permit the transformer 508 to be optimized for normal lamp illuminated condition which improves the overall system efficiency and permits the transformer to be smaller.

Although described above in connection with CCFLs, it should be understood that a similar apparatus and method can be used to drive fluorescent lamps having filaments, neon lamps, and the like.

The presently disclosed embodiments are to be considered in all respect as illustrative and not restrictive. The scope of the invention being indicated by the appended claims, rather than the foregoing description, and all changes which comes within the meaning and range of equivalency of the claims are, therefore, intended to be embraced therein.

What is claimed is:

1. A power conversion circuit for driving a fluorescent lamp, the circuit comprising:

a controller which generates control signals having active states and inactive states, said controller varying the durations of the active states and the inactive states;

a plurality of switching transistors coupled to a source of input power and responsive to said control signals to selectively conduct current from said source of input power; and a transformer having a primary winding directly coupled to said switching transistors to impose a substantially rectangular voltage signal across said primary winding, said transformer having a secondary winding coupled to said fluorescent lamp to provide a sinusoidal current to said fluorescent lamp.

2. The power conversion circuit of claim 1, wherein the controller is a pulse width modulating controller controlling current through said fluorescent lamp by modulating a duty cycle of said control signals.

3. A power conversion circuit for driving a fluorescent lamp, the circuit comprising:

a controller which generates control signals having active states and inactive states, said controller varying the durations of the active states and the inactive states;

a plurality of switching transistors coupled to a source of input power and responsive to said control signals to selectively conduct current from said source of input power; and a transformer having a primary winding directly coupled to said switching transistors to receive a substantially rectangular voltage signal from said switching transistors, said transformer having a secondary winding coupled to said fluorescent lamp to provide a sinusoidal current to said fluorescent lamp, wherein the controller is a pulse width modulating controller controlling current through said fluorescent lamp by modulating a duty cycle of said control signals, and wherein the pulse width modulating controller further comprises:

an oscillator for generating a clock signal with fixed frequency;

a current limit input for limiting a maximum amount of the current through the fluorescent lamp;

a dimming input for controlling a dimming level of the fluorescent lamp; and a signal generating circuit responsive to the clock signal, the current limit input and the dimming input and generating the control signals to the plurality of switching transistors to provide pulse width modulated control signals responsive to the clock signal, the current limit input and the dimming input.

4. The power conversion circuit of claim 1, wherein the plurality of switching transistors comprises a first pair of FETs and a second pair of FETs coupled in a full bridge topology.

5. The power conversion circuit of claim 4, wherein the first pair comprises P-channel FETs and the controller controls the current through the fluorescent by altering the duty cycle of the control signals associated with the P-channel FETs.

6. The power conversion circuit of claim 1, further comprising a feedback circuit for detecting and providing a signal representative of the current through the fluorescent lamp, wherein the feedback circuit is coupled between the secondary winding and the controller.

7. The power conversion circuit of claim 6, wherein the feedback circuit comprises a half-wave rectifier and a filter.

8. The power conversion circuit of claim 7, wherein the switching transistors are controlled to switch under near zero voltage switching turn-on conditions.

9. The power conversion circuit of claim 1, wherein the switching transistors are controlled to switch under near zero voltage switching turn-on conditions.

10. The power conversion circuit of claim 1, wherein a ballasting capacitor is coupled between the secondary winding and the fluorescent lamp.

11. The power conversion circuit of claim 1, wherein the fluorescent lamp is a cold cathode fluorescent lamp.

12. The power conversion circuit of claim 11 wherein said cold cathode fluorescent lamp provides lighting for a flat panel display.

13. The power conversion circuit of claim 12 wherein said flat panel display is in communication with a computer.

14. The power conversion circuit of claim 11 wherein said cold cathode fluorescent lamp provides lighting for a scanner.

15. The apparatus of claim 14 wherein said scanner is in communication with a computer.

16. A power converter circuit for converting a power signal to drive a fluorescent lamp, the circuit comprising:

a controller for providing control signals;

a non-tuned driver network responsive to the control signals and coupled to receive the power signal, the driver network having a plurality of transistors coupled to the controller and a primary winding of a transformer coupled to the plurality of transistors; and a secondary winding of the transformer magnetically coupled to the primary winding to provide a sinusoidal current to the fluorescent lamp.

17. The power conversion circuit of claim 16, wherein the controller controls the current provided to the fluorescent lamp by modulating the duty cycle of the control signals.

18. The power conversion circuit of claim 16, further comprising a feedback circuit for detecting and providing a voltage representing total current through the fluorescent lamp, wherein the feedback circuit is coupled between the secondary winding and the controller.

19. The power conversion circuit of claim 16, wherein the transistors of the driver network are switched to impose a rectangular wave across the primary winding.

20. The power conversion circuit of claim 16, further comprising a pulse width modulator for modulating a width of a signal provided to a sleep pin of the controller, wherein the signal provided to sleep pin controls the current provided to the fluorescent lamp.

21. The power conversion circuit of claim 16, wherein the fluorescent lamp is a cold cathode fluorescent lamp.

22. A method of converting a power signal to drive a fluorescent lamp, the method comprising the steps of:

generating a clock signal with a fixed frequency;

receiving a dimming level input;

generating control signals for controlling a plurality of transistors by using the clock signal and the dimming level input;

switching the plurality of the transistors by applying the control signals to the plurality of transistors;

providing a rectangular wave voltage signal to a primary winding of a transformer through the switching of the plurality of transistors; and inducing a sinusoidal voltage across a secondary winding of the transformer magnetically coupled to the primary winding, wherein the plurality of transistors is coupled to receive the power signal.

23. The method of claim 22, further comprising the steps of modulating pulse widths of the control signals based upon the dimming level input.

24. The method of claim 22, further comprising the step of providing a sinusoidal current to the fluorescent lamp, wherein the fluorescent lamp is coupled to the secondary winding.

25. The method of claim 22, further comprising the steps of detecting total current through the fluorescent lamp and modulating pulse widths of the control signals based upon the detected total current.

26. The method of claim 22, wherein the fluorescent lamp is a cold cathode fluorescent lamp.

27. An apparatus for converting a power signal to drive a fluorescent lamp, the apparatus comprising:

means for generating a clock signal with a fixed frequency;

means for receiving a dimming level input;

means for generating control signals for controlling a plurality of transistors by using the clock signal and the dimming level input;

means for switching the plurality of transistors by applying the control signals to the plurality of transistors;

means for providing a rectangular wave voltage signal to a primary winding of a transformer through the switching of the plurality of transistors; and means for inducing a sinusoidal voltage across a secondary winding of the transformer coupled magnetically to the primary winding, wherein the plurality of transistors is coupled to receive the power signal.

28. The apparatus of claim 27, further comprising means for modulating pulse widths of the control signals based upon the dimming level input.

29. The apparatus of claim 27, further comprising means for providing a sinusoidal current to the fluorescent lamp, wherein the secondary winding is coupled to the fluorescent lamp.

30. The apparatus of claim 27, further comprising:

means for detecting total current through the fluorescent lamp; and means for modulating pulse widths of the control signals based upon the detected total current.

31. The apparatus of claim 27, wherein the fluorescent lamp is a cold cathode fluorescent lamp.

32. A device for driving a fluorescent lamp, comprising:

a controller configured to provide control signals;

a non-tuned driver network, responsive to said control signals, configured to output a first signal; and a secondary network, responsive to said first signal, configured to provide a substantially sinusoidal current to said fluorescent lamp, wherein said non-tuned network operates at a non-resonating frequency.

33. The device according to claim 32, wherein the controller is adjustable to dim the fluorescent lamp.

34. The device according to claim 32, wherein the controller adjusts the non-resonating frequency to a minimum frequency for striking the fluorescent lamp.

35. The device according to claim 32, wherein the non-tuned driver network and the non-tuned secondary network are magnetically coupled.

* * * * *